Patented May 6, 1924.

1,493,208

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

CELLULOSE COMPOSITION AND PROCESS.

No Drawing. Application filed April 25, 1922. Serial No. 556,531.

*To all whom it may concern:*

Be it known that I, WILLIAM G. LINDSAY, a citizen of the United States, residing at Newark, in the county of Essex and State of New Jersey, have invented certain new and useful Improvements in Cellulose Compositions and Processes, of which the following is a specification.

This invention relates to a process for rendering certain inflammable materials, substance, or compounds, non-inflammable, and to the preparation of commercially useful non-inflammable articles, such as paper, textile fabrics, cellulose plastics, pyroxlyn plastics and the like.

The degree of non-inflammability sought for is that which will not permit of a self sustaining combustion, after the application of a flame at ordinary or normal temperature. This degree of non-inflammability will however, be varied according to desired conditions.

I have discovered that inflammable materials which permit of a self sustaining combustion by the application of a flame at ordinary or normal temperature may be prevented from burning under ordinary conditions and rendered non-inflammable provided there is present in suitable combination a heat absorbing compound capable of absorbing or taking up through decomposition, volatilization, or other change, all or the major part of the heat that would be necessary to raise the material or its components to the point at which ignition could be sustained.

This heat absorbing, or endothermic substance or compound should be of such nature that it will decompose, or otherwise be in condition to absorb heat, before or when the temperature of combustion of the material to be rendered non-inflammable has been reached. The absorption of heat will thus proceed at such a rate as to prevent the combustible material from attaining its temperature of ignition. The endothermic substance or compound will also be selected having in view other characteristics besides its heat absorbing capacity, on decomposition in that it may be desired to impart other properties to the resultant product. The relative proportions of the combustible substance, i. e., the substance to be rendered non-inflammable, and endothermic or heat absorbing substance, will be varied somewhat to meet conditions of strength, plasticity, transparency, or other desirable characteristics, but in general will be dependent upon the amount of decomposition, in heat unit equivalents, that can take place at or below the temperature at which combustion could be sustained by the exothermic compound if the heat of combustion were not absorbed at a greater rate than that at which it could be liberated. The general rule is that a sufficient quantity of endothermic substance should be employed to absorb upon its decomposition, a sufficient amount of heat to prevent a sustained combustion of the said exothermic substance.

In carrying out my invention, any one of a number of products may be the aim. The characteristics of these products may vary from that of a hard, non moldable, dense solid sheet material which may be used for cutting out various objects such as brush backs, mirror backs, knife handles, etc., to that of a thin, highly flexible product which may be used for the veneering of fabrics, paper and the like or which can be used in place of various textiles and other flexible materials. The flexible compound may also be used as a substitute for leather. It may also possess the necessary characteristics required in compounds that are to be molded such as molded boxes, molded handles, molded brushes, mirrors, etc.

In carrying out the invention the procedure will vary according to the nature and physical properties of the material treated. The exothermic substance which I propose to use will be nitrocellulose, acetylcellulose, or some cellulosic ester, ether, derivative, or compound.

In the following examples I give such proportions as will be applicable to compounds containing nitrocellulose, as this is the most inflammable of the cellulose derivatives and any substance that may be incorporated with the nitrate for the purpose of reducing, limiting or preventing combustion will be effective with other compounds of cellulose, and as a matter of fact, with cellulose itself.

The permanent or non-volatile solvents, generally referred to as the plasticizing agents and which are to be combined with the pyroxylin or other cellulose derivative for the purpose of bringing about the necessary conversion, etc. in the course of manufacture, should be of such nature that the point of ignition is relatively high. In my experiments I have found that the organic phosphates possess the necessary characteristics of solubility and at the same time possess the requisite temperature of ignition. The most satisfactory results are produced with the aromatic phosphates because of their relatively high stability and resistance to decomposition, and because they possess at the same time the necessary solvent or plasticizing effect on the nitrocellulose, as well as a relatively high ignition point.

To a mixture of nitrocellulose and an aromatic phoshate, as for example, liquid tricresylphosphate, I add a sufficient amount of calcium tartrate to prevent the combined mixture from sustaining ignition upon the application and withdrawal of a flame. An example of proportions for this purpose is 100 parts of pyroxylin, 75 parts of liquid tricresylphosphate, and 125 parts of calicum tartrate ($CaC_4H_4O_6 \cdot 4H_2O$.) Material of this composition, when manufactured according to the usual methods as obtain in the pyroxylin plastic industry, will possess hardness, toughness and moldability in similar degree to the usual varieties of celluloid, manufactured in the form of ivory, opaque colors and the like.

In the manufacture of these non-inflammably compounds I proceed substantially as in the manufacture of ordinary pyroxylin plastic materials incorporating the calcium tartrate compound with the soaked or colloidized mass of pyroxylin and liquid tricresylphosphate prior to final mastication on the rolls. This incorporation may be effected in kneaders or the calicum tartrate compound may be directly added during the course of mastication on the rolls. The calcium tartrate compound may also be incorporated with the pyroxylin in the same operation in which the liquid tricresylphosphate is incorporated, the method for which is described in my U. S. Patent No. 1,233,374, granted July 17, 1917. In accordance with this method the wet pyroxylin is mixed with the non-volatile solvent such as tricresylphosphate and the mixture subjected to pressure and absorption to remove the water.

In the choice of liquid volatile solvent, I may select any one or a combination of a number of the common ordinary solvents, such as methyl alcohol, ethyl alcohol, acetic ether, acetone, amyl acetate, or the various commerical grades and mixtures of these compounds as are ordinarily found upon the market.

In the manufacture of the flexible non-inflammable compound having the properties of leather and the like, I proceed as in the example specified but instead of employing 75 parts of liquid tricresylphosphate, I increase the amount to 200 parts to 100 parts pyroxylin. Material of this composition may be worked up according to the usual method for the manufacture of pyroxylin plastic compounds and produced in the form of sheets by shaving from a block, or it may be dissolved in a suitable proportion of solvent such as wood alcohol, acetone and the like and spread upon a suitable surface such as textile fabric, leather and the like.

I claim:—

1. A composition containing a cellulose ester, an aromatic phosphate and in close association therewith calcium tartrate in sufficient quantity to produce a fire retarding effect.

2. A composition containing a cellulose ester, an aromatic phosphate and in close association therewith calicum tartrate containing water of crystallization, said tartrate being present in sufficient quantity to produce a fire retarding effect.

3. A composition containing a cellulose ester and tricresylphosphate in admixture with sufficient calcium tartrate to produce a fire retarding effect.

4. A composition containing a cellulose ester and a fire-retarding ingredient containing calcium tartrate, said latter ingredient being present in excess of 25% of said composition.

5. A composition containing pyroxylin, an aromatic phosphate and a fire retarding ingredient comprising calcium tartrate.

6. A composition containing pyroxylin, tricresylphosphate and a fire retarding ingredient comprising calcium tartrate.

7. The process which consists in mixing tricresylphosphate and calicum tartrate with hydrous pyroxylin and subjecting the mixture to pressure to remove water therefrom.

8. The process which consists in mixing liquid tricresylphosphate and calcium tartrate with hydrous pyroxylin, removing the water therefrom by pressure and absorption and manipulating the mixture in the presence of a volatile solvent.

9. A composition having substantially the toughness and moldability of the usual pyroxylin plastics and containing in excess of 30 per cent calcium tartrate.

10. A tough consolidated non-inflammable cellulose composition containing calcium tartrate.

11. A tough non-inflammable cellulose composition containing calcium tartrate in excess of 25 per cent of said composition.

12. A composition having substantially the physical properties of the usual pyroxylin plastics and containing as a fire retarding material calcium tartrate.

13. A composition comprising a non-fibrous cellulosic material and calcium tartrate in sufficient quantity to produce a fire retarding effect.

WILLIAM G. LINDSAY.